(12) United States Patent
Berger et al.

(10) Patent No.: US 12,683,724 B2
(45) Date of Patent: Jul. 14, 2026

(54) SINGLE-CARRIER DATA AND MULTI-CARRIER REFERENCE SIGNALS

(71) Applicant: QUALCOMM Incorporated, San Diego, CA (US)

(72) Inventors: Peer Berger, Hod Hasharon (IL); Shay Landis, Hod Hasharon (IL); Valeri Sokolovski, Holon (IL); Almog Shaul Hershko, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 550 days.

(21) Appl. No.: 18/174,515

(22) Filed: Feb. 24, 2023

(65) Prior Publication Data

US 2024/0291600 A1 Aug. 29, 2024

(51) Int. Cl.
*H04L 5/00* (2006.01)

(52) U.S. Cl.
CPC .......... *H04L 5/0007* (2013.01); *H04L 5/0051* (2013.01)

(58) Field of Classification Search
CPC . H04L 5/0007; H04L 5/0051; H04L 27/2628; H04L 27/2636; H04L 27/0008; H04L 27/2613; H04L 5/0048
See application file for complete search history.

(56) References Cited

U.S. PATENT DOCUMENTS

| | | | | |
|---|---|---|---|---|
| 2017/0332376 A1* | 11/2017 | He | .......... | H04L 5/18 |
| 2018/0198662 A1* | 7/2018 | Sahin | ........ | H04L 25/03834 |
| 2018/0279292 A1* | 9/2018 | Luo | ........ | H04W 72/21 |
| 2020/0389786 A1* | 12/2020 | Yerramalli | ...... | H04L 27/2646 |
| 2021/0378000 A1* | 12/2021 | Zhang | ....... | H04L 5/0094 |
| 2024/0357510 A1* | 10/2024 | Haghighat | ...... | H04W 52/262 |
| 2025/0168763 A1* | 5/2025 | Agarwal | ........ | H04B 7/0626 |

FOREIGN PATENT DOCUMENTS

| | | | | |
|---|---|---|---|---|
| WO | WO-2023081225 A1 * | 5/2023 | ...... | H04L 5/0007 |

* cited by examiner

*Primary Examiner* — Sharmin Chowdhury
(74) *Attorney, Agent, or Firm* — Holland & Hart LLP

(57) ABSTRACT

Methods, systems, and devices for wireless communications are described. A wireless communications device may receive a waveform including both a first waveform comprising an orthogonal frequency division multiplexing (OFDM) waveform and a second waveform comprising a single-carrier waveform via a set of time-frequency resources. The wireless device may decode the first waveform based on receiving the waveform, where the first waveform includes one or more reference signals. The wireless communications device may decode the second waveform based on receiving the waveform and on a time domain equalization filter that is based on decoding the one or more reference signals, where the second waveform comprises a set of data bits. In some examples, the waveform may further include a third waveform including a second OFDM waveform and the wireless communications device may decode the third waveform including one or more second reference signals based on receiving the waveform.

18 Claims, 16 Drawing Sheets

410

420

415

405

400

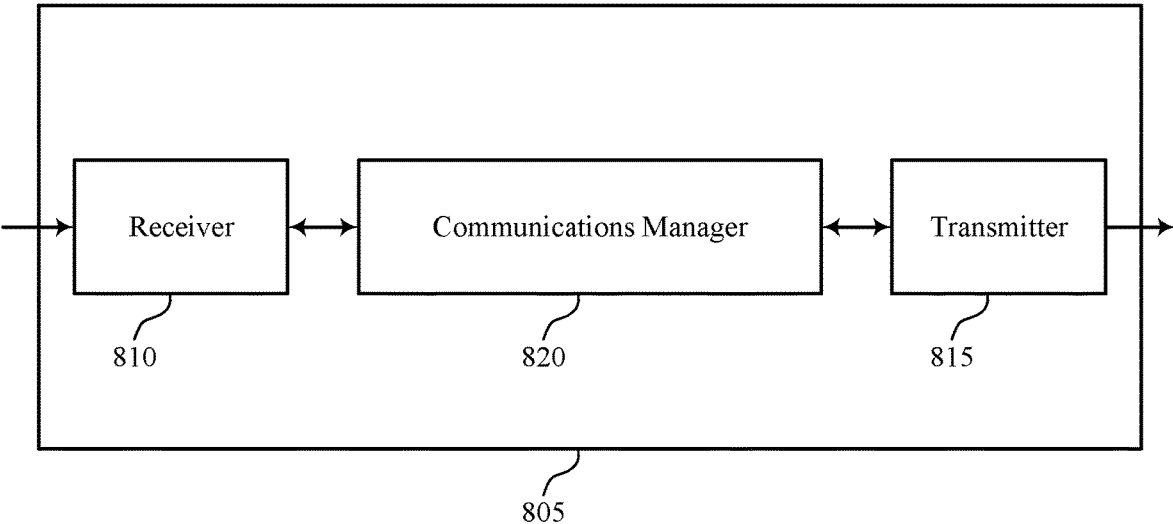
FIG. 8

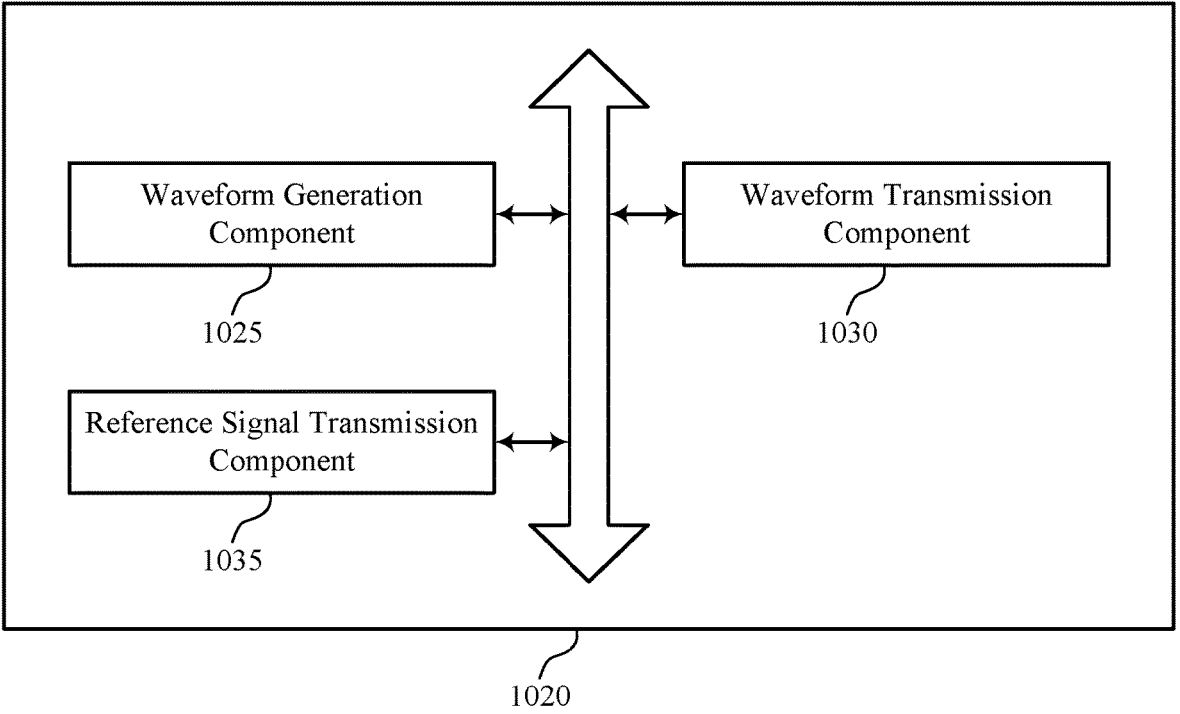
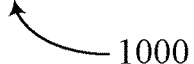
FIG. 10

130    105    115

Network
Entity

Transceiver

1110

Antenna

1115

Communications
Manager

1120

Memory

Code

1130

1125

1140

Processor

1135

1105

1100

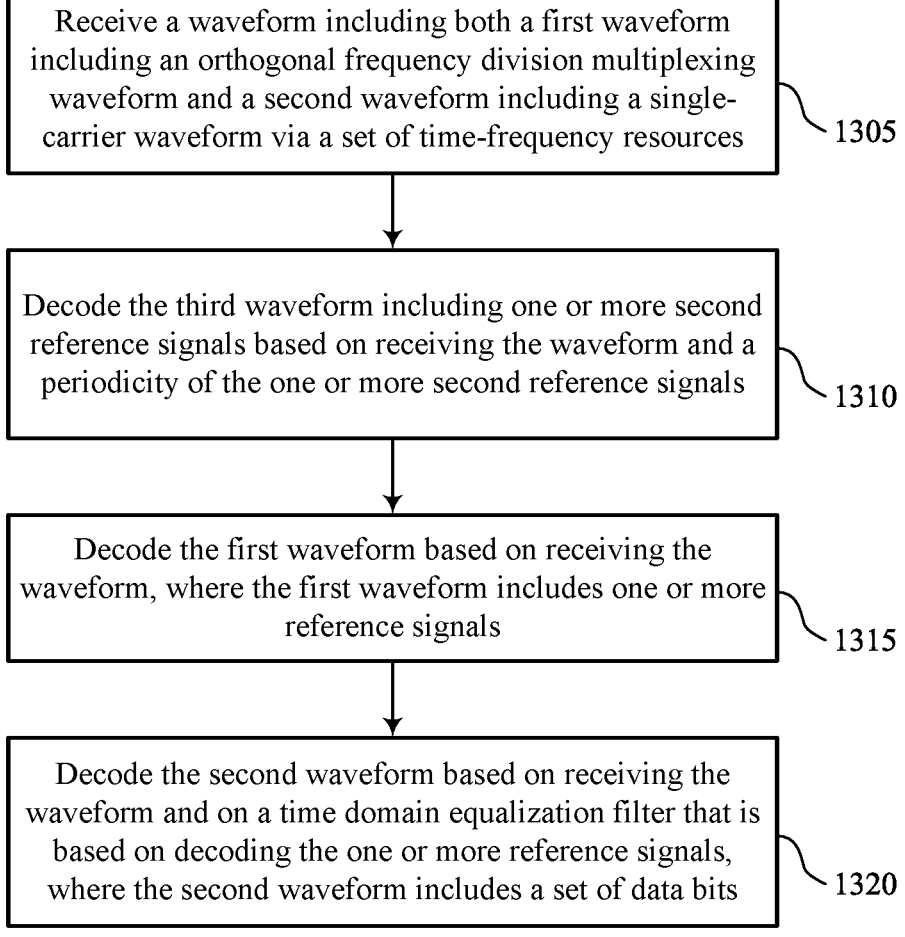

Receive a waveform including both a first waveform including an orthogonal frequency division multiplexing waveform and a second waveform including a single-carrier waveform via a set of time-frequency resources
1305

Decode the third waveform including one or more second reference signals based on receiving the waveform and a periodicity of the one or more second reference signals
1310

Decode the first waveform based on receiving the waveform, where the first waveform includes one or more reference signals
1315

Decode the second waveform based on receiving the waveform and on a time domain equalization filter that is based on decoding the one or more reference signals, where the second waveform includes a set of data bits
1320

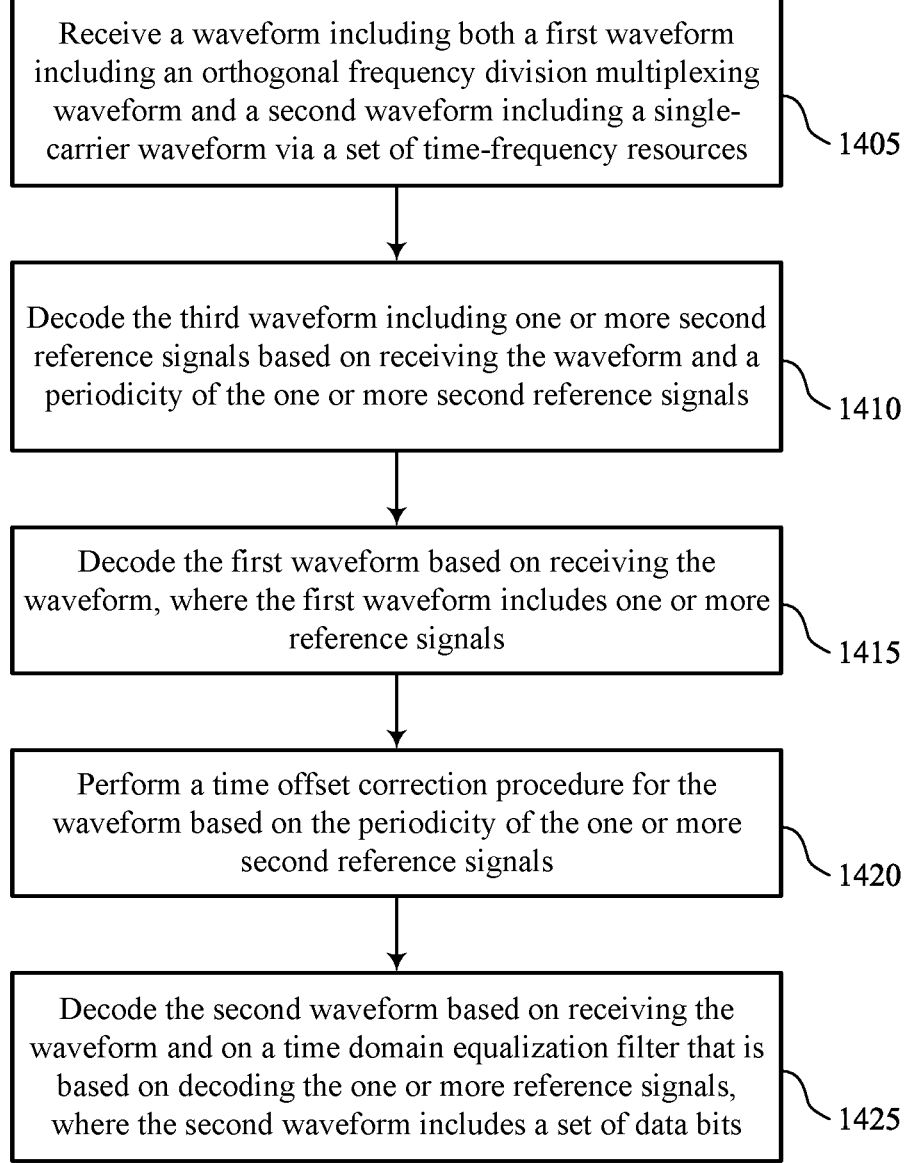

Receive a waveform including both a first waveform including an orthogonal frequency division multiplexing waveform and a second waveform including a single-carrier waveform via a set of time-frequency resources ⎰ 1405

Decode the third waveform including one or more second reference signals based on receiving the waveform and a periodicity of the one or more second reference signals ⎰ 1410

Decode the first waveform based on receiving the waveform, where the first waveform includes one or more reference signals ⎰ 1415

Perform a time offset correction procedure for the waveform based on the periodicity of the one or more second reference signals ⎰ 1420

Decode the second waveform based on receiving the waveform and on a time domain equalization filter that is based on decoding the one or more reference signals, where the second waveform includes a set of data bits ⎰ 1425

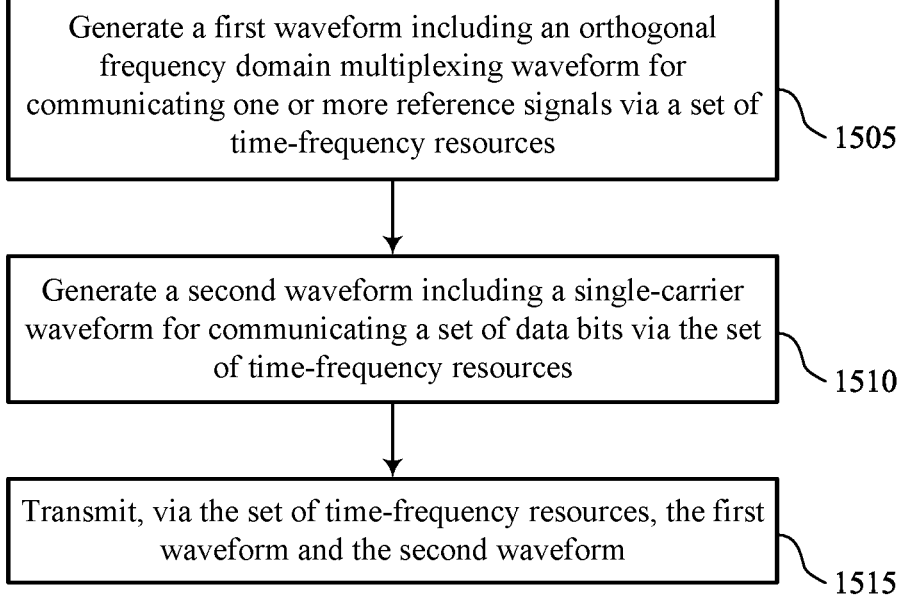

Generate a first waveform including an orthogonal frequency domain multiplexing waveform for communicating one or more reference signals via a set of time-frequency resources

1505

Generate a second waveform including a single-carrier waveform for communicating a set of data bits via the set of time-frequency resources

1510

Transmit, via the set of time-frequency resources, the first waveform and the second waveform

SINGLE-CARRIER DATA AND MULTI-CARRIER REFERENCE SIGNALS

FIELD OF TECHNOLOGY

The following relates to wireless communications, including single-carrier data and multi-carrier reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Wireless communications may include transmission or reception, or both, of reference signals and data via one or more waveforms that may be supported by CDMA. TDMA, FDMA, OFDMA, or DFT-S-OFDM technologies.

SUMMARY

The described techniques relate to improved methods, systems, devices, and apparatuses that support single-carrier data and multi-carrier reference signals. For example, the described techniques provide for the communication of a waveform including a multi-carrier waveform (e.g., such as an orthogonal frequency division multiple access (OFDMA) waveform) for communication of one or more sets of reference signals (e.g., channel state information reference signals (CSI-RS), demodulation reference signal (DMRS), synchronization signal blocks (SSBs)) and including a single-carrier waveform for communication of data.

For example, some frequency ranges (e.g., sub-terahertz frequency ranges) for wireless communications may be used for applications such as transmitting large amounts of data, among other examples. However, some waveforms for transmitting via sub-terahertz frequency ranges may suffer from large power consumption and high latency. Thus, a combined or hybrid waveform for the communication of large quantities of data in sub-THz deployments may be generated such that the benefits of transmitting data via single-carrier waveforms rather than via OFDM waveforms (e.g., decreased phase noise, loss of throughput due to cyclic prefix) may be attained while the disadvantages of single-carrier waveforms (e.g., power consumption due to pulse-shaping, timing offsets) may be mitigated by transmitting reference signals for channel estimation via OFDM waveform. In some such examples, the increased power and resource consumption of pulse-shaping and timing calculations may be avoided by determining a time domain equalization filter based on transmission of one or more reference signals (e.g., DMRS, SSBs).

A method for wireless communication is described. The method may include receiving a waveform including both a first waveform including an orthogonal frequency division multiplexing waveform and a second waveform including a single-carrier waveform via a set of time-frequency resources, decoding the first waveform based on receiving the waveform, where the first waveform includes one or more reference signals, and decoding the second waveform based on receiving the waveform and on a time domain equalization filter that is based on decoding the one or more reference signals, where the second waveform includes a set of data bits.

An apparatus for wireless communication is described. The apparatus may include a processor, memory coupled with the processor, and instructions stored in the memory. The instructions may be executable by the processor to cause the apparatus to receive a waveform including both a first waveform including an orthogonal frequency division multiplexing waveform and a second waveform including a single-carrier waveform via a set of time-frequency resources, decode the first waveform based on receiving the waveform, where the first waveform includes one or more reference signals, and decode the second waveform based on receiving the waveform and on a time domain equalization filter that is based on decoding the one or more reference signals, where the second waveform includes a set of data bits.

Another apparatus for wireless communication is described. The apparatus may include means for receiving a waveform including both a first waveform including an orthogonal frequency division multiplexing waveform and a second waveform including a single-carrier waveform via a set of time-frequency resources, means for decoding the first waveform based on receiving the waveform, where the first waveform includes one or more reference signals, and means for decoding the second waveform based on receiving the waveform and on a time domain equalization filter that is based on decoding the one or more reference signals, where the second waveform includes a set of data bits.

A non-transitory computer-readable medium storing code for wireless communication is described. The code may include instructions executable by a processor to receive a waveform including both a first waveform including an orthogonal frequency division multiplexing waveform and a second waveform including a single-carrier waveform via a set of time-frequency resources, decode the first waveform based on receiving the waveform, where the first waveform includes one or more reference signals, and decode the second waveform based on receiving the waveform and on a time domain equalization filter that is based on decoding the one or more reference signals, where the second waveform includes a set of data bits.

In some examples of the method, apparatuses, and non-transitory computer-readable medium described herein, the waveform further includes a third waveform including a second orthogonal frequency division multiplexing waveform and the method, apparatuses, and non-transitory computer-readable medium may include further operations, features, means, or instructions for decoding the third waveform including one or more second reference signals based on receiving the waveform and a periodicity of the one or more second reference signals.

In some examples of the method, apparatuses, and non-transitory computer-readable medium described herein, the second waveform may be decoded without pulse shaping.

In some examples of the method, apparatuses, and non-transitory computer-readable medium described herein, decoding the second waveform may include operations, features, means, or instructions for performing a time offset correction procedure for the waveform based on the periodicity of the one or more second reference signals.

In some examples of the method, apparatuses, and non-transitory computer-readable medium described herein, the one or more second reference signals include one or more synchronization signal block reference signals.

In some examples of the method, apparatuses, and non-transitory computer-readable medium described herein, decoding the first waveform may include operations, features, means, or instructions for descrambling the one or more reference signals and estimating the time domain equalization filter based on the descrambled one or more reference signals.

In some examples of the method, apparatuses, and non-transitory computer-readable medium described herein, determining the time domain equalization filter may include operations, features, means, or instructions for applying a transform to the descrambled one or more reference signals to estimate the time domain equalization filter.

In some examples of the method, apparatuses, and non-transitory computer-readable medium described herein, the transform includes a fast Fourier transform or an inverse fast Fourier transform.

In some examples of the method, apparatuses, and non-transitory computer-readable medium described herein, the one or more reference signals include demodulation reference signals.

A method for wireless communication is described. The method may include generating a first waveform including an orthogonal frequency domain multiplexing waveform for communicating one or more reference signals via a set of time-frequency resources, generating a second waveform including a single-carrier waveform for communicating a set of data bits via the set of time-frequency resources, and transmitting, via the set of time-frequency resources, the first waveform and the second waveform.

An apparatus for wireless communication is described. The apparatus may include a processor, memory coupled with the processor, and instructions stored in the memory. The instructions may be executable by the processor to cause the apparatus to generate a first waveform including an orthogonal frequency domain multiplexing waveform for communicating one or more reference signals via a set of time-frequency resources, generate a second waveform including a single-carrier waveform for communicating a set of data bits via the set of time-frequency resources, and transmit, via the set of time-frequency resources, the first waveform and the second waveform.

Another apparatus for wireless communication is described. The apparatus may include means for generating a first waveform including an orthogonal frequency domain multiplexing waveform for communicating one or more reference signals via a set of time-frequency resources, means for generating a second waveform including a single-carrier waveform for communicating a set of data bits via the set of time-frequency resources, and means for transmitting, via the set of time-frequency resources, the first waveform and the second waveform.

A non-transitory computer-readable medium storing code for wireless communication is described. The code may include instructions executable by a processor to generate a first waveform including an orthogonal frequency domain multiplexing waveform for communicating one or more reference signals via a set of time-frequency resources, generate a second waveform including a single-carrier waveform for communicating a set of data bits via the set of time-frequency resources, and transmit, via the set of time-frequency resources, the first waveform and the second waveform.

In some examples of the method, apparatuses, and non-transitory computer-readable medium described herein, the generating of the second waveform may be performed without pulse shaping.

Some examples of the method, apparatuses, and non-transitory computer-readable medium described herein may further include operations, features, means, or instructions for generating a third waveform including a second orthogonal frequency domain multiplexing waveform for communicating one or more second reference signals via the set of time-frequency resources and transmitting the third waveform via the set of time-frequency resources according to a periodicity associated with the one or more second reference signals.

In some examples of the method, apparatuses, and non-transitory computer-readable medium described herein, transmitting the third waveform may include operations, features, means, or instructions for determining the periodicity of the one or more second reference signals based on one or more of a channel condition associated with the set of time-frequency resources and one or more hardware components of a device for performing the wireless communication.

In some examples of the method, apparatuses, and non-transitory computer-readable medium described herein, the one or more second reference signals includes synchronization signal block reference signals.

In some examples of the method, apparatuses, and non-transitory computer-readable medium described herein, the one or more reference signals include demodulation reference signals.

BRIEF DESCRIPTION OF THE DRAWINGS

FIGS. 8 and 9 illustrate block diagrams of devices that support single-carrier data and multi-carrier reference signals in accordance with one or more aspects of the present disclosure.

FIG. 10 illustrates a block diagram of a communications manager that supports single-carrier data and multi-carrier reference signals in accordance with one or more aspects of the present disclosure.

FIGS. 12 through 16 illustrate flowcharts showing methods that support single-carrier data and multi-carrier reference signals in accordance with one or more aspects of the present disclosure.

DETAILED DESCRIPTION

A hybrid or combination waveform for communications is introduced for applications including communications below a threshold frequency (e.g., sub-THz frequency communications) where reference signals may be transmitted via orthogonal frequency duplexing (OFDM) waveforms and while data may be transmitted via single-carrier waveforms (e.g., true single carrier, different from single carrier FDMA). The hybrid or combined waveform may include one or more OFDM waveforms for communication of reference signals as well as a single-carrier waveform for communication of data and may be transmitted by a device such as a network node or a UE.

For example, a transmitting device (such as a network entity or a user equipment) may generate a waveform including a first multi-carrier waveform (e.g., OFDM waveform) for communicating a first set of reference signals (e.g., SSBs or another type of reference signals for determining a timing offset of data), a second multi-carrier waveform (e.g., OFDM waveform) for communicating a second set of reference signals (e.g., DMRS), and a third single-carrier waveform for communicating data (e.g., a set of data bits.

The combination waveform may reduce complexity and power consumption of some communications. For example, the combined waveform may be decoded by a receiving device such as a network node or a UE using a single filter per symbol which decreases complexity and power consumption at the receiving device. Further, differently from transmission of data via OFDM or SC-FDMA, the combined waveform may not require there be FFT/IFFT processing in slots carrying data thereby conserving power at the transmitting device and the receiving device. Additionally, differently from some single carrier communications (e.g., single carrier communication of data, and reference signals), the combination waveform may include data that is communicated without pulse shaping (e.g., performed independently from a pulse shaping procedure). For example, there may not be a pulse shaping filter or requirement at the transmitting device or for decoding at the receiving device. Further, the combined waveform may allow for higher throughput by reclaiming resources that would otherwise be used by cyclic prefixes when data is communicated via multi-carrier waveforms.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to single-carrier data and multi-carrier reference signals.

Figure 1:
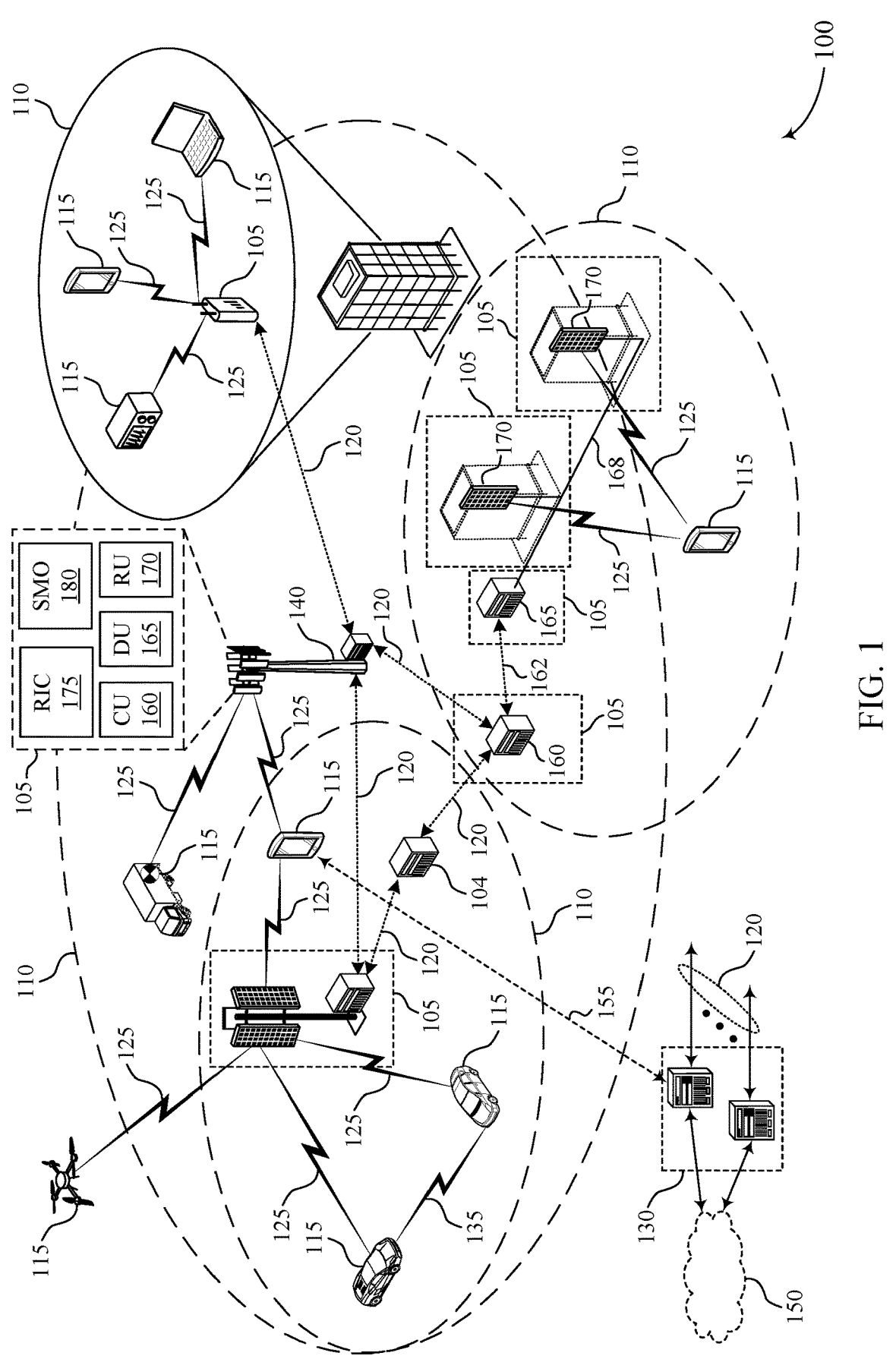
FIG. 1 illustrates an example of a wireless communications system that supports single-carrier data and multi-carrier reference signals in accordance with one or more aspects of the present disclosure.

FIG. 1 illustrates an example of a wireless communications system 100 that supports single-carrier data and multi-carrier reference signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support single-carrier data and multi-carrier reference signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support communication of a waveform including a multi-carrier waveform (e.g., such as an orthogonal frequency division multiple access (OFDMA) waveform) for communication of one or more sets of reference signals (e.g., channel state information reference signals (CSI-RS), demodulation reference signal (DMRS), synchronization signal blocks (SSBs)) and including a single-carrier waveform for communication of data.

For example, some frequency ranges (e.g., sub-terahertz frequency ranges) for wireless communications may be used for applications such as transmitting large amounts of data, among other examples. However, some waveforms for transmitting via sub-terahertz frequency ranges may suffer from large power consumption and high latency. Thus, a combined or hybrid waveform for the communication of large quantities of data in sub-terahertz deployments may be generated such that the benefits of communicating data via single-carrier waveforms rather than via OFDM waveforms (e.g., decreased phase noise, loss of throughput due to cyclic prefix) may be attained while the disadvantages of single-carrier waveforms (e.g., power consumption due to pulse-shaping, timing offsets) may be mitigated by transmitting reference signals for channel estimation via OFDM wave-form. In some such examples, the increased power and resource consumption of pulse-shaping and timing calculations may be avoided by determining a time domain equal-ization filter based on transmission of one or more reference signals (e.g., DMRS, SSBs).

For example, the network device 105 may generate an OFDM waveform for communicating one or more reference signals (e.g., SSBs) via a set of time-frequency resources. The network entity 105 may generate a second OFDM waveform for communicating one or more second reference signals via the set of time-frequency resources and may generate a third waveform including a single-carrier wave-form for communicating a set of data bits via the set of time-frequency resources. The network entity may transmit, via the set of time-frequency resources to a UE 115, the first waveform, the second waveform, and the third waveform as a combined or hybrid waveform that includes both multi-carrier portions (e.g., first and second waveforms) and single-carrier portions (e.g., third waveform). The UE 115 may receive, via the set of time-frequency resources, the waveform including the first waveform including the OFDM waveform carrying first reference signals, the second wave-form including the OFDM waveform carrying second ref-erence signals, and the third waveform including a single-carrier waveform carrying data. The UE 115 may decode the first waveform, the second waveform, and the third wave-form, wherein decoding the third waveform may be based on a time domain equalization filter determined based on the second reference signals. In some examples, the data may be transmitted and decoded without pulse shaping (e.g., with-out a pulse shaping procedure that may be performed on other instances of single-carrier data transmission).

Figure 2:
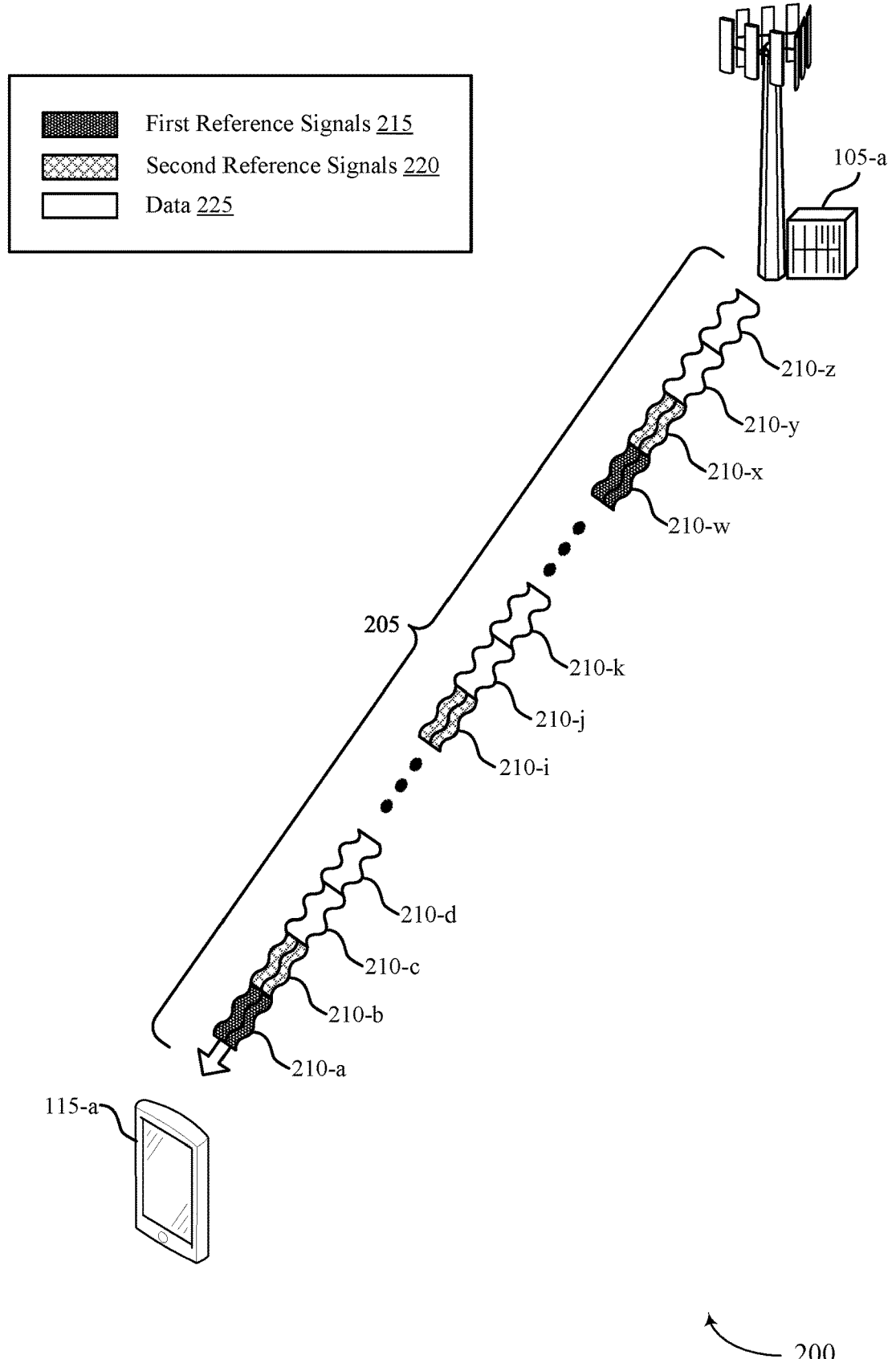
FIG. 2 illustrates an example of a wireless communications system that supports single-carrier data and multi-carrier reference signals in accordance with one or more aspects of the present disclosure.

FIG. 2 illustrates an example of a wireless communica-tions system 200 that supports single-carrier data and multi-carrier reference signals in accordance with one or more aspects of the present disclosure. The wireless communica-tions system 200 may include a UE 115-a and a network entity 105-a which may be examples of the corresponding devices as described with reference to FIG. 1.

The wireless communications system 200 may include a hybrid or combination waveform 205 for communications between the UE 115-a and the network entity 105-a in situations including communications below a threshold fre-quency (e.g., sub-terahertz frequency communications) where one or more first reference signals 215 (e.g., SSBs) may be transmitted via multi-carrier waveform (e.g., OFDM waveform), one or more second reference signals 220 (e.g., DMRS) and data 225 may be transmitted via single-carrier waveforms (e.g., true single carrier, different from single carrier FDMA). For example, communication of the data 225 via single carrier, e.g., 64QAM/256QAM/etc., without pulse shaping (e.g., working in the symbol rate) may cause the waveform 205 to suffer from timing offset which may in turn affect time domain equalization of the waveform 205. The UE 115-a may perform time domain equalization to the waveform 205 (e.g., due to the single-carrier waveform carrying data 225 (e.g., dissimilar to OFDM waveforms that may carry data where the equalization may be in the frequency domain)). For example, to increase performance, reduce complexity, or both at the UE 115-a or the network entity 105-b, or both, the timing offset of the data 225 may be corrected using the first reference signals 215 to enhance time domain equalization.

The network entity 105-a may generate a first portion of the waveform 205 for transmitting first reference signals 215 via slot a set of time-frequency resources. In some examples, the first portion of the waveform 205 may be a multi-carrier waveform. The network entity 105-a may generate a second portion of the waveform 205 for transmission of second reference signals 220 via the set of time-frequency resources. In some examples, the second portion of the waveform 205 may be a multi-carrier waveform. The net-work entity 105-a may generate a third portion of the waveform 205 for transmission of data 225 via the set of time-frequency resources. In some examples, the third por-tion of the waveform 205 may be a single-carrier waveform that is generated without pulse shaping.

The network entity 105-a may transmit the waveform 205 to the UE 115-a. For example, at least part of the first portion of the waveform 205 may be transmitted via slots 210-a, . . . , 210-w, at least part of the second portion of the waveform 205 may be transmitted via slots 210-b, . . . , 210-i, . . . , 210-x, and at least part of the third portion of the waveform 205 may be transmitted via slots 210-c, 210-d, . . . , 210-j, 210-k, 210-y, 210-z. For example, the transmission of the first, second, and third portions of the waveform 205 may be distributed throughout slots 210-a through 210-z, where each of the first reference signals 215, the second reference signals 220, and the data 225 may have a different periodicity with respect to each other, each of which may differ from the periodicities shown in wireless communications system 200, which are illustrated herein for the purposes of demonstration and are not limiting in scope. In some examples, the first reference signals 215 may have a smaller periodicity than the second set of reference signals 220 which may have a smaller periodicity than the data 225.

The waveform 205 including a combination of multi-carrier waveforms for reference signal transmission (e.g., first reference signals 215 and second reference signals 220) and single-carrier waveforms for data 225 may reduce complexity and power consumption of some communica-tions. For example, the waveform 205 may be decoded by UE 115-a which may apply a single filter or process to each symbol 210 which may decrease complexity and power consumption at the UE 115-a compared to transmission of a purely multi-carrier waveform. For example, the UE 115-a may apply a fractional delay estimation to slots 210-a, . . . , 210-w carrying first reference signals 215, time domain equalization to slots 210-b, . . . , 210-i, . . . , 210-x carrying second reference signals 220, and may perform finite impulse response equalization on slots 210-c, 210-d, . . . , 210-j, 210-k, . . . , 210-y, 210-z carrying the data 225 and log likelihood ratio generation for forward error correction.

Further, differently from transmission of data via multi-carrier waveform (e.g., OFDM or SC-FDMA), the wave-form 205 may not require there be FFT/IFFT processing in slots carrying data 225 thereby conserving power at the UE 115-a and the network entity 105-b. Additionally, differently from some other single carrier communications (e.g., single carrier communication of data, and reference signals), the waveform 205 may include data that is communicated without pulse shaping (e.g., there may not be a pulse shaping filter or requirement at the transmitting device or for decoding at the receiving device). Further, the combined waveform may allow for higher throughput by reclaiming resources that would otherwise be used by cyclic prefixes when data 225 is otherwise communicated via multi-carrier waveforms.

Figure 3:
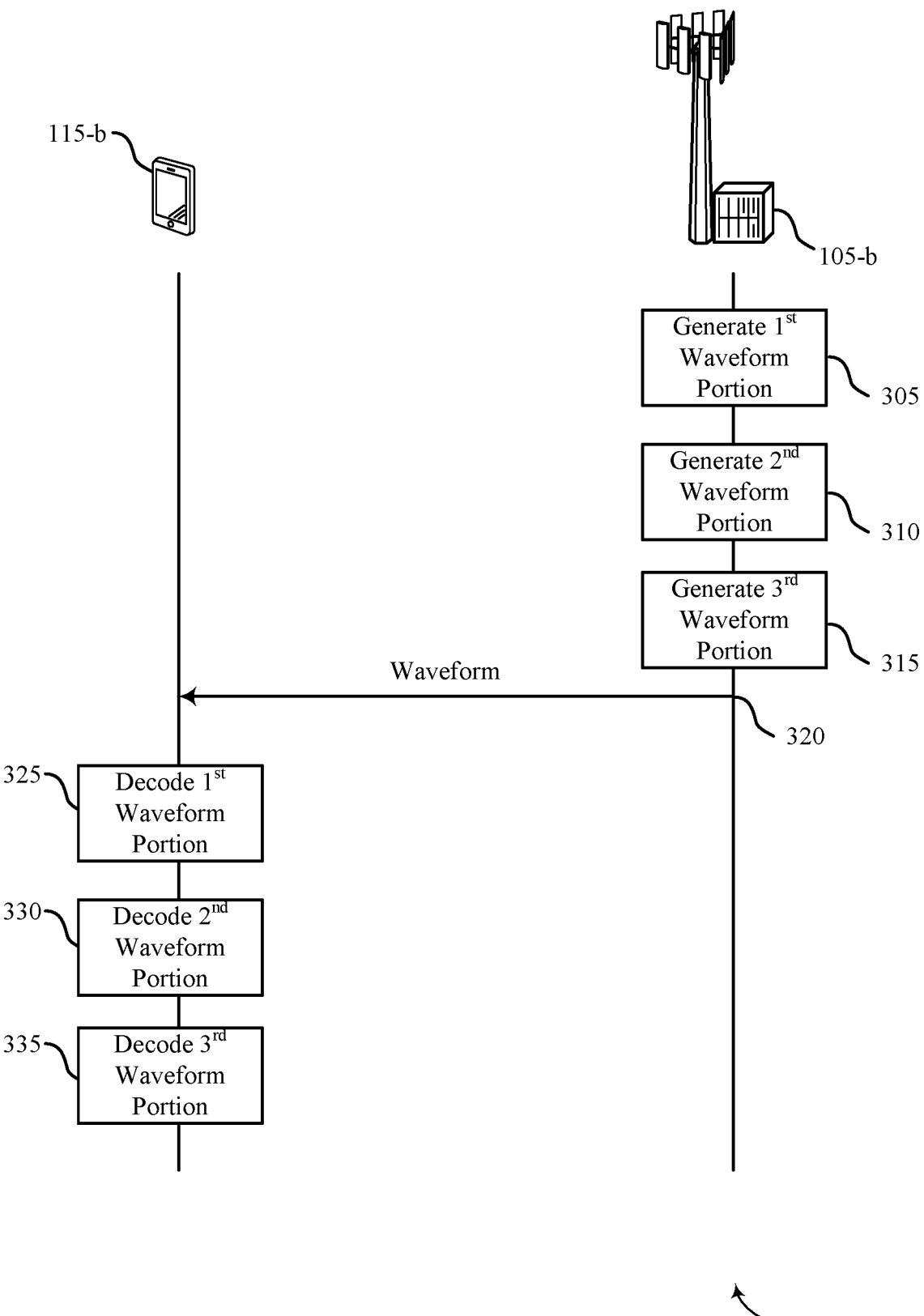
FIG. 3 illustrates an example of a process flow that supports single-carrier data and multi-carrier reference signals in accordance with one or more aspects of the present disclosure.

FIG. 3 illustrates an example of a process flow 300 that supports single-carrier data and multi-carrier reference signals in accordance with one or more aspects of the present disclosure. In some examples, the process flow 300 may implement or be implemented by aspects of the wireless communications system 100 and the wireless communications system 200. For example, the process flow 300 may include a network entity 105-*b* and UE 115-*b*, which may be examples of the corresponding devices as described with reference to FIGS. 1 and 2. While the operations are described as occurring between the UE 115-*b* and the network entity 105-*b*, the operations may be performed by any device in any order and one or more operations may be added or omitted from the operations.

At 305, the network entity 105-*b* may generate a first waveform portion of a combined waveform (e.g., a first portion of a total waveform). For example, the network entity 105-*b* may generate a first waveform including a multi-carrier waveform (e.g., OFDM waveform) for communicating one or more reference signals via a set of time-frequency resources. The one or more reference signals may include SSBs.

At 310, the network entity 105-*b* may generate a second waveform portion of the combined waveform (e.g., a second portion of the total waveform). For example, the network entity 105-*b* may generate a second waveform including a multi-carrier waveform (e.g., OFDM waveform) for communicating one or more second reference signals via the set of time-frequency resources. The one or more reference signals may include DMRS.

At 315, the network entity 105-*b* may generate a third waveform portion of the combined waveform (e.g., a third portion of the total waveform). For example, the network entity 105-*b* may generate a third waveform including a single-carrier waveform for communicating data (e.g., a set of data bits) via the set of time-frequency resources. In some examples, the third waveform is generated without pulse shaping. For example, the third waveform may not be pulse-shaped when generated or transmitted. The third waveform may thus be formed independently from a pulse-shaping procedure that may be performed in other instances of data communication (e.g., multi-carrier waveform communication of data).

At 320, the network entity 105-*b* may transmit the combined waveform including the first waveform portion, the second waveform portion, and the third waveform portion. In some examples, the combined waveform may be transmitted via the set of time-frequency resources. The network entity 105-*b* may, in some cases, transmit the one or more reference signals via the first waveform as part of the combined waveform according to a periodicity that may be used to determine a timing offset of data carried by the third waveform. For example, based on the transmitted periodicity, the UE 115-*b* may estimate the timing offset in a sub-sample resolution using a faster sampling rate on a dedicated signal. The resolution may be sufficient such that Equalizer_Taps is a small subset of $$H_{TD}^{inv}$$

(e.g., 0.2[symbol duration]), where $$H_{TD}^{inv} = IFFT\left\{\frac{1}{H_{FD}}\right\},$$

and $H_{FD}$ is the frequency domain calculated based on the unscrambled second set of reference signals (e.g., DMRS) Because the described techniques may be applied to low frequency offset scenarios, the timing offset may be relatively static, and thus the SSB periodicity may be relatively small. In some examples, the UE 115-*b* may correct frequency offset or phase noise, or both using a decision feedback equalizer on time resources in which data is communicated.

The network entity 105-*b* may determine the periodicity of the one or more reference signals based on one or more of a channel condition associated with the set of time-frequency resources and one or more hardware components of the UE 115-*b* or the network entity 105-*b*, or both.

At 325, the UE 115-*b* may decode the first waveform portion of the combined waveform (e.g., the first portion of the total waveform) received from the network entity 105-*b* at 320. For example, the UE 115-*b* may decode the first waveform including the one or more reference signals (e.g., SSBs) based on receiving the waveform and the periodicity of the one or more reference signals. In some examples, the UE 115-*b* may perform a time offset correction procedure for the waveform based on the periodicity of the one or more second reference signals. For example, the UE 115-*b* may estimate the timing offset in a sub-sample resolution using a faster sampling rate on a dedicated signal. The resolution may be sufficient such that Equalizer_Taps is a small subset of $$H_{TD}^{inv}$$

(e.g., 0.2[symbol duration]), where $$H_{TD}^{inv} = IFFT\left\{\frac{1}{H_{FD}}\right\},$$

and $H_{FD}$ is the frequency domain calculated based on the unscrambled second set of reference signals (e.g., DMRS) Because the described techniques may be applied to low Doppler spread scenarios, the timing offset may be relatively static, and thus the SSB periodicity may be relatively small. In some examples, the UE 115-*b* may correct frequency offset or phase noise, or both using a decision feedback equalizer on time resources in which data is communicated. In some examples, the UE 115-*b* may perform a fractional delay estimation on the SSBs.

At 330, the UE 115-*b* may decode the second waveform portion of the combined waveform (e.g., the second portion of the total waveform) received from the network entity 105-*b* at 320. For example, the UE 115-*b* may decode the second waveform based on receiving the waveform, where the second waveform includes the one or more second reference signals (e.g., DMRS). In some examples, the UE may descramble the one or more second reference signals and may estimate a time domain equalization filter based at least in part on the descrambled one or more reference signals. For example, the UE 115-*b* may estimate the TD equalization filter, $$H_{TD}^{inv}$$

as the IFFT of the descrambled DMRS after calculating 1/H, according to Equation [1].

$$H_{TD}^{inv} = IFFT\left\{\frac{1}{H_{FD}}\right\} \qquad [1]$$

In some examples, $$\frac{1}{H_{FD}}$$

may be obtained from descrambling the DMRS and assuming a high signal to noise ratio (e.g., assuming sufficient time synchronization, where the timing offset is relatively small, and high coherent BW, Equalizer$_{Taps}$ is a small subset of $$H_{TD}^{inv}.$$

In some examples, the UE 115-*b* may estimate the TD equalization filter, H$_{TD}$ as the FFT of the descrambled DMRS after calculating H, according to Equation [2].

$$H_{TD} = FFT\{H_{FD}\} \qquad [1]$$

For example, the UE 115-*b* may use one of Equations 1 or 2 depending on a type of the equalizer (e.g., if the equalizer is to be calculated using the channel (e.g., H) or the inverse channel (e.g., 1/H)). For example, when the UE 115-*b* uses decision feedback equalization, the UE 115-*b* may use equation 2 and when using finite impulse response equalization, the UE 115-*b* may use Equation 1.

Because the described techniques may be applicable in low Doppler spread scenarios, the channel may be relatively static, and the DMRS periodicity may be small.

At 335, the UE 115-*b* may decode the third waveform portion of the combined waveform (e.g., the third portion of the total waveform) received from the network entity 105-*b* at 320. The third waveform portion may include a single-carrier waveform. In some examples, decoding the third waveform portion of the combined waveform may include decoding the data (e.g., the set of data bits) carried by the third waveform portion. The UE 115-*b* may determine a timing offset of the data based on the one or more reference signals communicated via the first portion of the waveform. For example, the UE 115-*b* may decode the third waveform based on receiving the waveform and on the time domain equalization filter determined by decoding the one or more second reference signals. The UE 115-*b* may decode the third waveform without pulse shaping. The UE 115-*b* may perform a time offset correction procedure for the waveform based on the periodicity of the one or more reference signals and may apply the time domain equalization to the data slots. For example, the UE 115-*b* may perform finite impulse response equalization on the data and log likelihood ratio generation for forward error correction.

Figure 4:
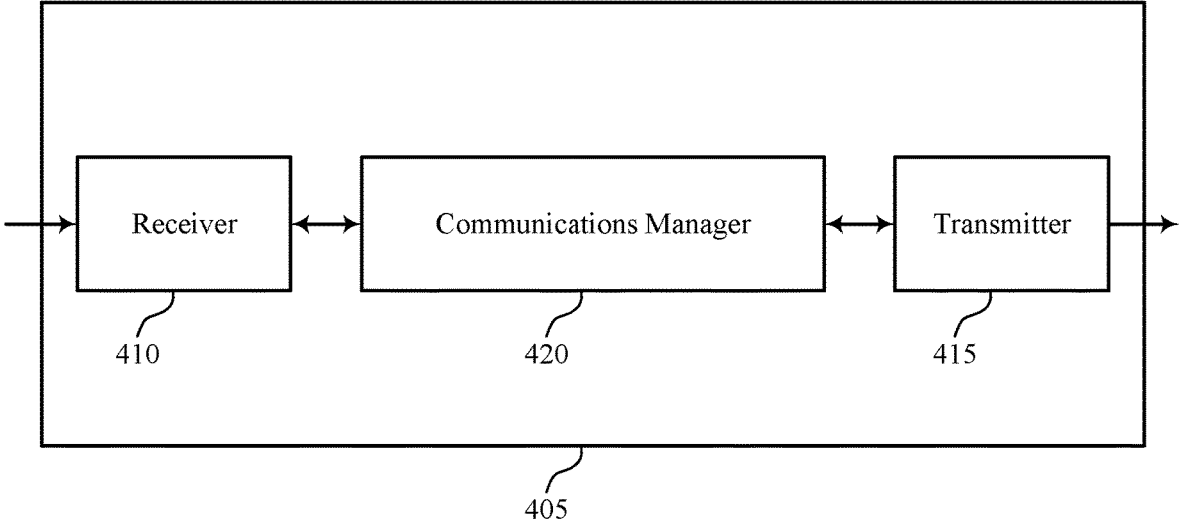
FIGS. 4 and 5 illustrate block diagrams of devices that support single-carrier data and multi-carrier reference signals in accordance with one or more aspects of the present disclosure.

FIG. 4 illustrates a block diagram 400 of a device 405 that supports single-carrier data and multi-carrier reference signals in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to single-carrier data and multi-carrier reference signals). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to single-carrier data and multi-carrier reference signals). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of single-carrier data and multi-carrier reference signals as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication in accordance with examples as disclosed herein. For example, the communications manager 420 may be configured as or otherwise support a means for receiving a waveform including both a first waveform including an orthogonal frequency division multiplexing waveform and a second waveform including a single-carrier waveform via a set of time-frequency resources. The communications manager 420 may be configured as or otherwise support a means for decoding the first waveform based on receiving the waveform, where the first waveform includes one or more reference signals. The communications manager 420 may be configured as or otherwise support a means for decoding the second waveform based on receiving the waveform and on a time domain equalization filter that is based on decoding the one or more reference signals, where the second waveform includes a set of data bits.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, and more efficient utilization of communication resources, among other examples.

Figure 5:
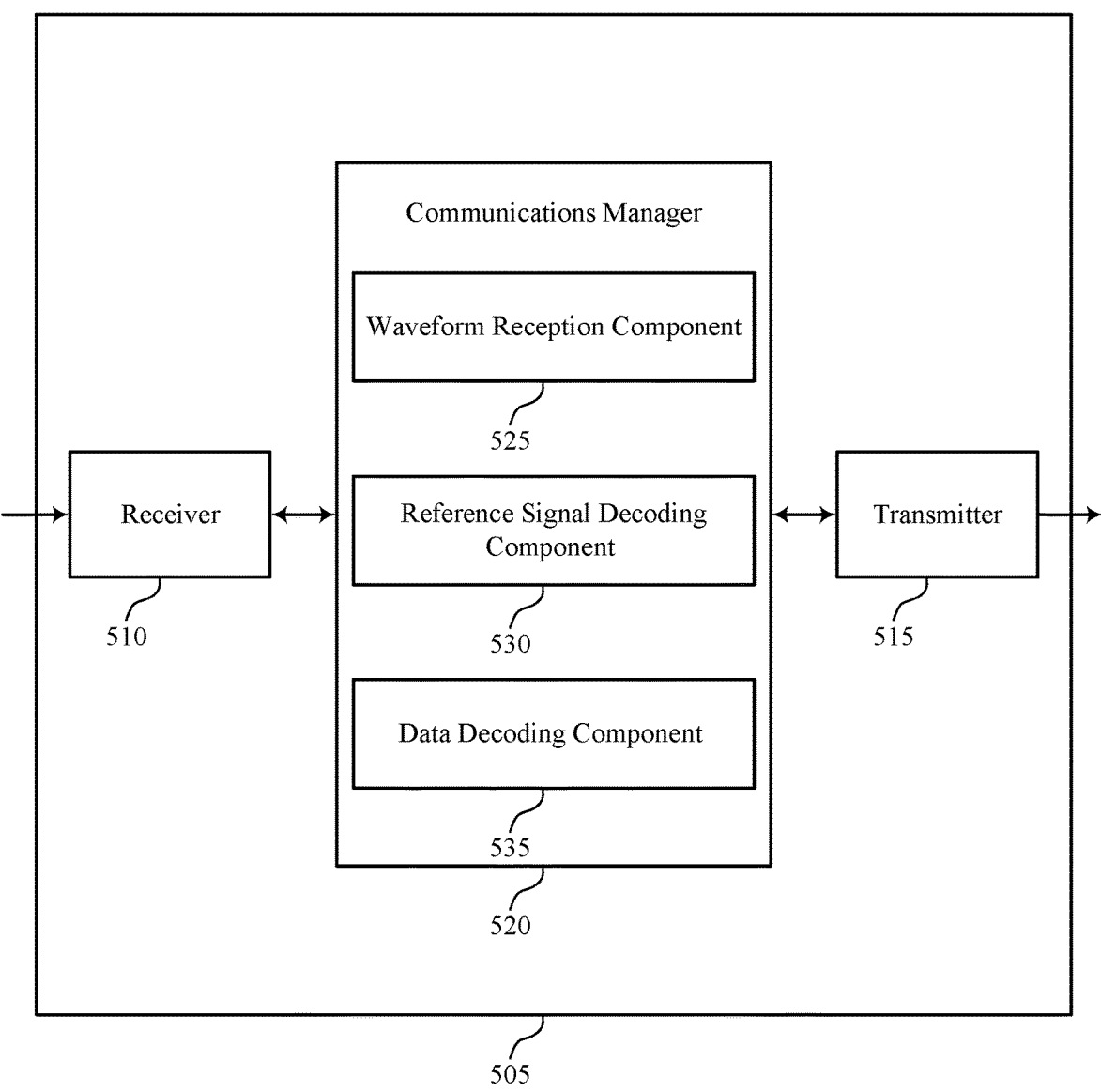

FIG. 5 illustrates a block diagram 500 of a device 505 that supports single-carrier data and multi-carrier reference signals in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to single-carrier data and multi-carrier reference signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to single-carrier data and multi-carrier reference signals). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of single-carrier data and multi-carrier reference signals as described herein. For example, the communications manager 520 may include a waveform reception component 525, a reference signal decoding component 530, a data decoding component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. The waveform reception component 525 may be configured as or otherwise support a means for receiving a waveform including both a first waveform including an orthogonal frequency division multiplexing waveform and a second waveform including a single-carrier waveform via a set of time-frequency resources. The reference signal decoding component 530 may be configured as or otherwise support a means for decoding the first waveform based on receiving the waveform, where the first waveform includes one or more reference signals. The data decoding component 535 may be configured as or otherwise support a means for decoding the second waveform based on receiving the waveform and on a time domain equalization filter that is based on decoding the one or more reference signals, where the second waveform includes a set of data bits.

Figure 6:
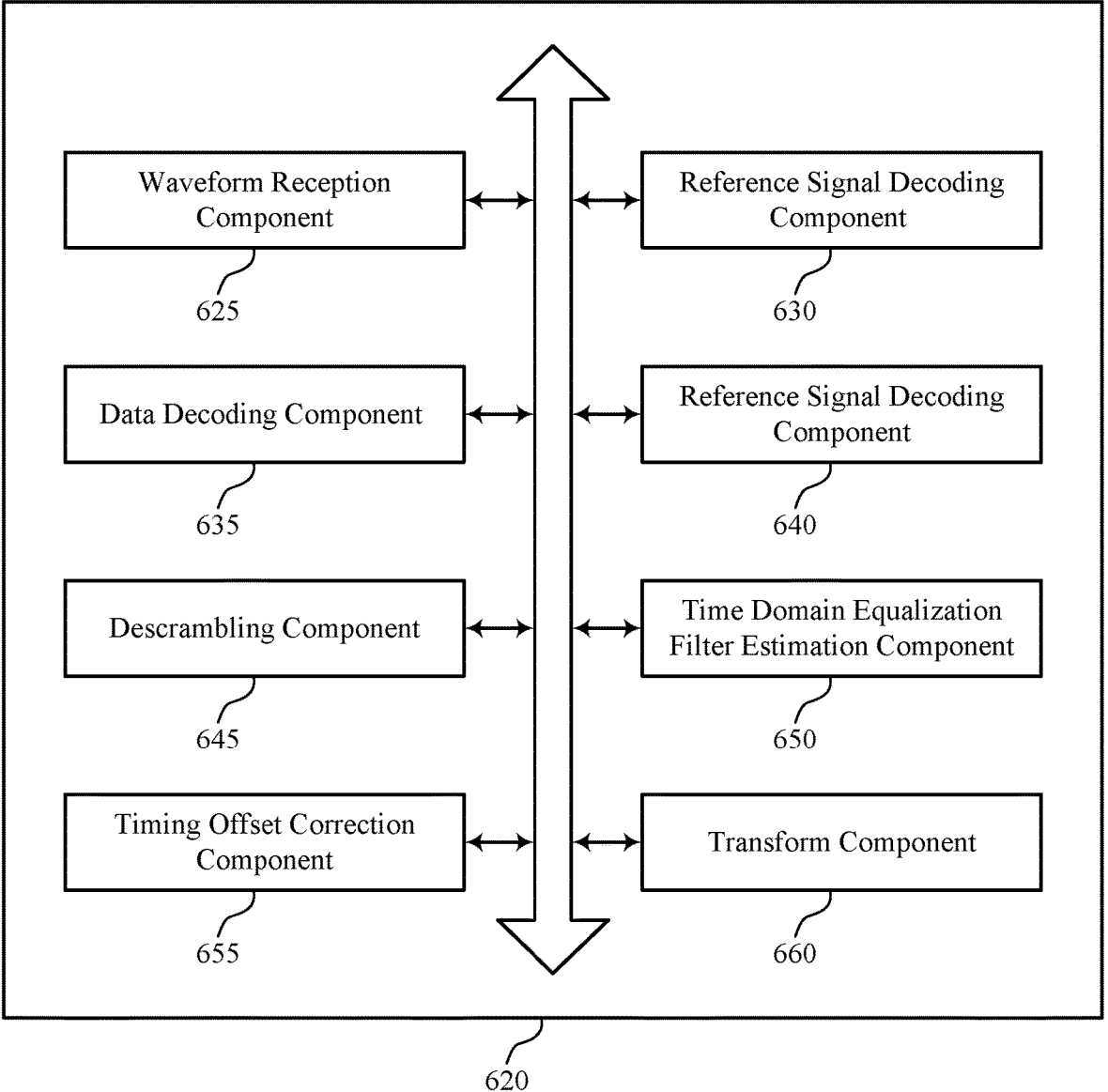
FIG. 6 illustrates a block diagram of a communications manager that supports single-carrier data and multi-carrier reference signals in accordance with one or more aspects of the present disclosure.

FIG. 6 illustrates a block diagram 600 of a communications manager 620 that supports single-carrier data and multi-carrier reference signals in accordance with one or more aspects of the present disclosure. The communications manager 620 may be an example of aspects of a communications manager 420, a communications manager 520, or both, as described herein. The communications manager 620, or various components thereof, may be an example of means for performing various aspects of single-carrier data and multi-carrier reference signals as described herein. For example, the communications manager 620 may include a waveform reception component 625, a reference signal decoding component 630, a data decoding component 635, a reference signal decoding component 640, a descrambling component 645, a time domain equalization filter estimation component 650, a timing offset correction component 655, a transform component 660, or any combination thereof. Each of these components may communicate, directly or indirectly, with one another (e.g., via one or more buses).

The communications manager 620 may support wireless communication in accordance with examples as disclosed herein. The waveform reception component 625 may be configured as or otherwise support a means for receiving a waveform including both a first waveform including an orthogonal frequency division multiplexing waveform and a second waveform including a single-carrier waveform via a set of time-frequency resources. The reference signal decoding component 630 may be configured as or otherwise support a means for decoding the first waveform based on receiving the waveform, where the first waveform includes one or more reference signals. The data decoding component 635 may be configured as or otherwise support a means for decoding the second waveform based on receiving the waveform and on a time domain equalization filter that is based on decoding the one or more reference signals, where the second waveform includes a set of data bits.

In some examples, the waveform further includes a third waveform including a second orthogonal frequency division multiplexing waveform, and the reference signal decoding component 640 may be configured as or otherwise support a means for decoding the third waveform including one or more second reference signals based on receiving the waveform and a periodicity of the one or more second reference signals.

In some examples, the second waveform is decoded without pulse shaping.

In some examples, to support decoding the second waveform, the timing offset correction component 655 may be configured as or otherwise support a means for performing a time offset correction procedure for the waveform based on the periodicity of the one or more second reference signals.

In some examples, the one or more second reference signals include one or more synchronization signal block reference signals.

In some examples, to support decoding the first waveform, the descrambling component 645 may be configured as or otherwise support a means for descrambling the one or more reference signals. In some examples, to support decoding the first waveform, the time domain equalization filter estimation component 650 may be configured as or otherwise support a means for estimating the time domain equalization filter based on the descrambled one or more reference signals.

In some examples, to support determining the time domain equalization filter, the transform component 660 may be configured as or otherwise support a means for applying a transform to the descrambled one or more reference signals to estimate the time domain equalization filter.

In some examples, the transform includes a fast Fourier transform or an inverse fast Fourier transform.

In some examples, the one or more reference signals include demodulation reference signals.

Figure 7:
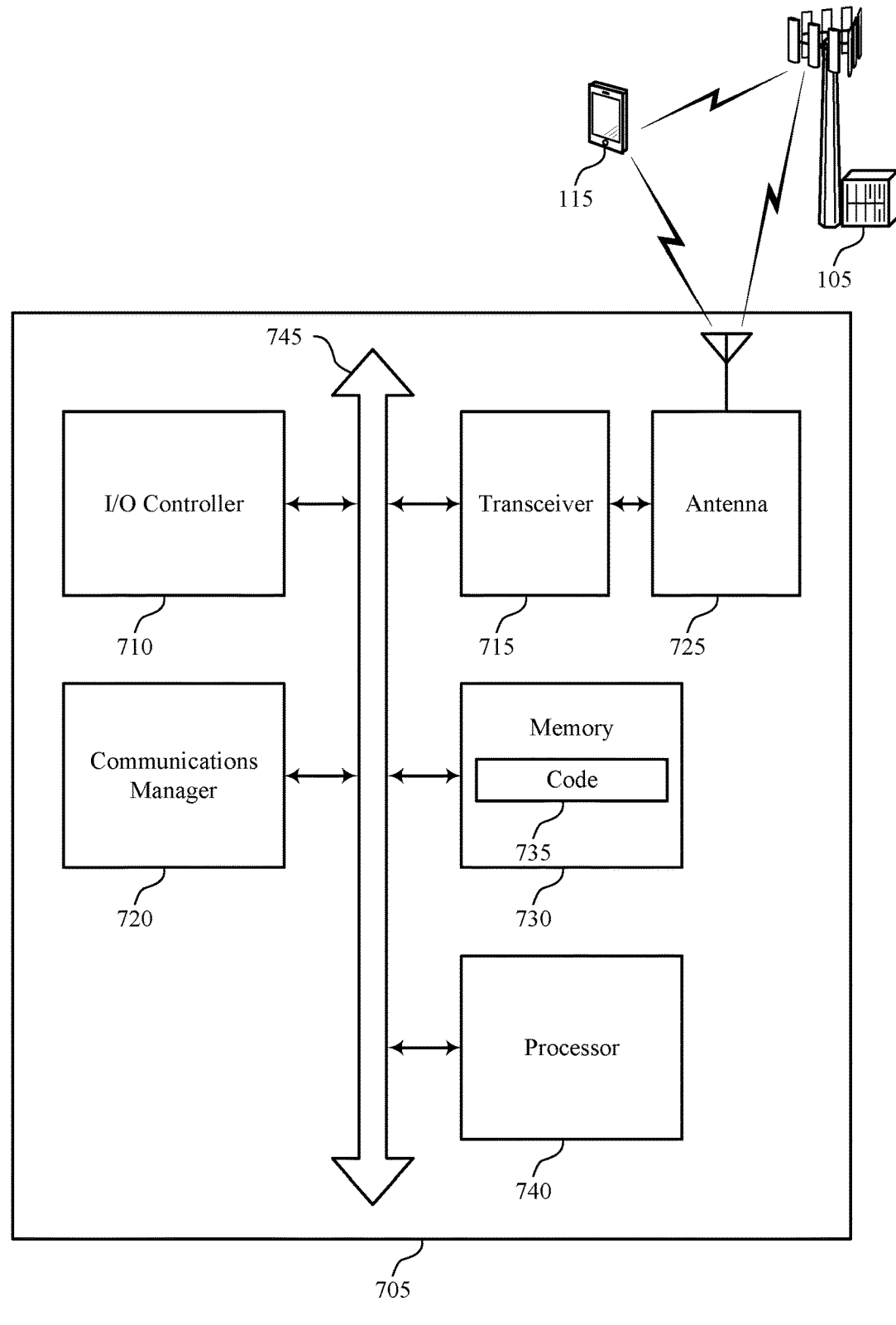
FIG. 7 illustrates a diagram of a system including a device that supports single-carrier data and multi-carrier reference signals in accordance with one or more aspects of the present disclosure.

FIG. 7 illustrates a diagram of a system 700 including a device 705 that supports single-carrier data and multi-carrier reference signals in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting single-carrier data and multi-carrier reference signals). For example, the device 705 or a component of the device 705 may include a processor 740 and memory 730 coupled with or to the processor 740, the processor 740 and memory 730 configured to perform various functions described herein.

The communications manager 720 may support wireless communication in accordance with examples as disclosed herein. For example, the communications manager 720 may be configured as or otherwise support a means for receiving a waveform including both a first waveform including an orthogonal frequency division multiplexing waveform and a second waveform including a single-carrier waveform via a set of time-frequency resources. The communications manager 720 may be configured as or otherwise support a means for decoding the first waveform based on receiving the waveform, where the first waveform includes one or more reference signals. The communications manager 720 may be configured as or otherwise support a means for decoding the second waveform based on receiving the waveform and on a time domain equalization filter that is based on decoding the one or more reference signals, where the second waveform includes a set of data bits.

By including or configuring the communications manager 720 in accordance with examples as described herein, the device 705 may support techniques for improved user experience related to reduced processing, reduced power consumption, higher throughput, longer battery life, and improved utilization of processing capability, among other examples.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of single-carrier data and multi-carrier reference signals as described herein, or the processor 740 and the memory 730 may be otherwise configured to perform or support such operations.

FIG. 8 illustrates a block diagram 800 of a device 805 that supports single-carrier data and multi-carrier reference signals in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter

815 and the receiver 810 may be co-located in a transceiver, which may include or be coupled with a modem.

The communications manager 820, the receiver 810, the transmitter 815, or various combinations thereof or various components thereof may be examples of means for performing various aspects of single-carrier data and multi-carrier reference signals as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 may be configured as or otherwise support a means for generating a first waveform including an orthogonal frequency domain multiplexing waveform for communicating one or more reference signals via a set of time-frequency resources. The communications manager 820 may be configured as or otherwise support a means for generating a second waveform including a single-carrier waveform for communicating a set of data bits via the set of time-frequency resources. The communications manager 820 may be configured as or otherwise support a means for transmitting, via the set of time-frequency resources, the first waveform and the second waveform.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources, among other examples.

Figure 9:
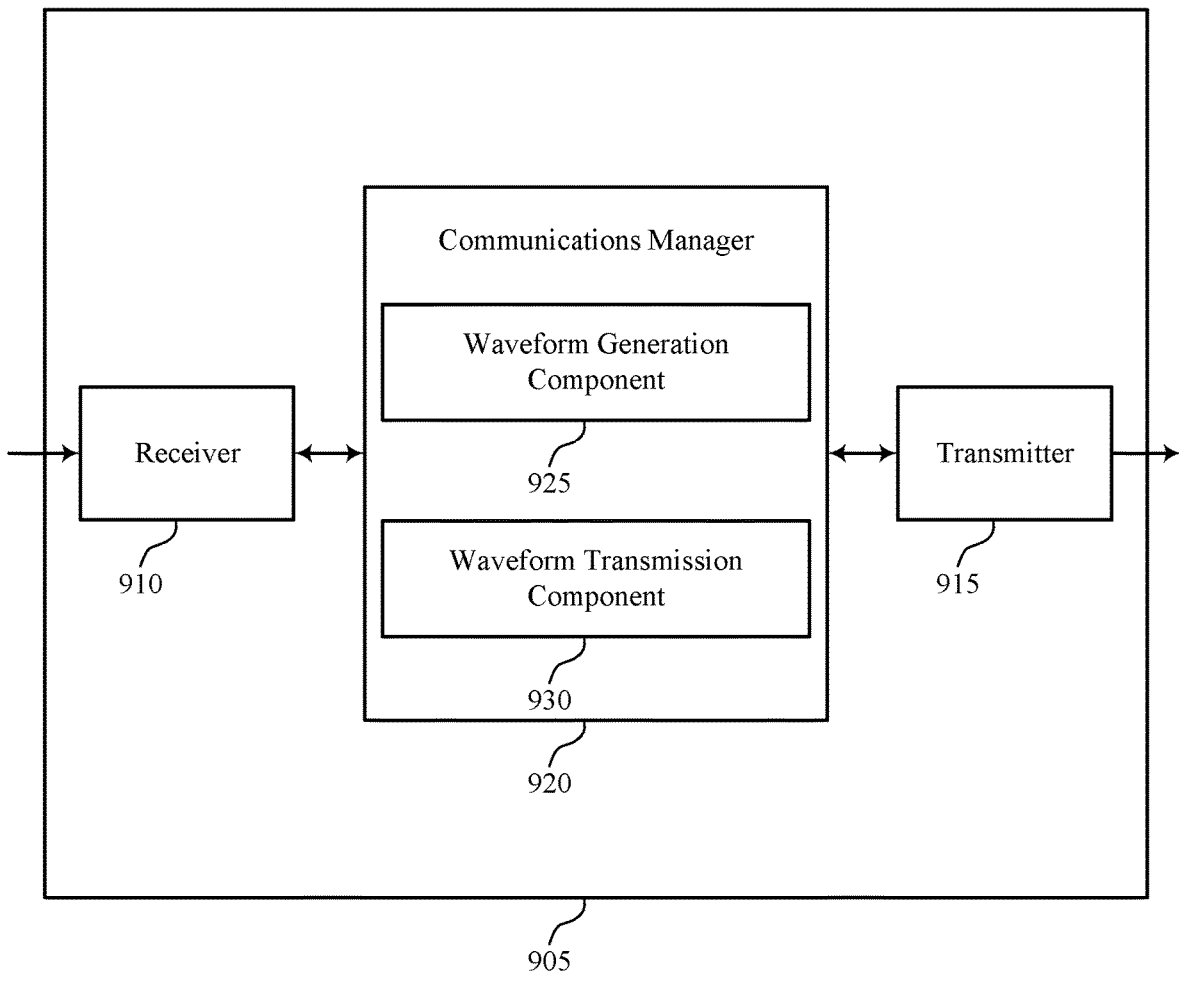

FIG. 9 illustrates a block diagram 900 of a device 905 that supports single-carrier data and multi-carrier reference signals in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of single-carrier data and multi-carrier reference signals as described herein. For example, the communications manager 920 may include a waveform generation component 925 a waveform transmission component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The waveform generation component 925 may be configured as or otherwise support a means for generating a first waveform including an orthogonal frequency domain multiplexing waveform for communicating one or more reference signals via a set of time-frequency resources. The waveform generation component 925 may be configured as or otherwise support a means for generating a second waveform including a single-carrier waveform for communicating a set of data bits via the set of time-frequency resources. The waveform transmission component 930 may be configured as or otherwise support a means for transmitting, via the set of time-frequency resources, the first waveform and the second waveform.

FIG. 10 illustrates a block diagram 1000 of a communications manager 1020 that supports single-carrier data and multi-carrier reference signals in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of single-carrier data and multi-carrier reference signals as described herein. For example, the communications manager 1020 may include a waveform generation component 1025, a waveform transmission component 1030, a reference signal transmission component 1035, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication in accordance with examples as disclosed herein. The waveform generation component 1025 may be configured as or otherwise support a means for generating a first waveform including an orthogonal frequency domain multiplexing waveform for communicating one or more reference signals via a set of time-frequency resources. In some examples, the waveform generation component 1025 may be configured as or otherwise support a means for generating a second waveform including a single-carrier waveform for communicating a set of data bits via the set of time-frequency resources. The waveform transmission component 1030 may be configured as or otherwise support a means for transmitting, via the set of time-frequency resources, the first waveform and the second waveform.

In some examples, the generating of the second waveform is performed without pulse shaping.

In some examples, the waveform generation component 1025 may be configured as or otherwise support a means for generating a third waveform including a second orthogonal frequency domain multiplexing waveform for communicating one or more second reference signals via the set of time-frequency resources. In some examples, the waveform transmission component 1030 may be configured as or otherwise support a means for transmitting the third waveform via the set of time-frequency resources according to a periodicity associated with the one or more second reference signals.

In some examples, to support transmitting the third waveform, the reference signal transmission component 1035 may be configured as or otherwise support a means for determining the periodicity of the one or more second reference signals based on one or more of a channel condition associated with the set of time-frequency resources and one or more hardware components of a device for performing the wireless communication.

In some examples, the one or more second reference signals includes synchronization signal block reference signals.

In some examples, the one or more reference signals include demodulation reference signals.

Figure 11:
FIG. 11 illustrates a diagram of a system including a device that supports single-carrier data and multi-carrier reference signals in accordance with one or more aspects of the present disclosure.

FIG. 11 illustrates a diagram of a system 1100 including a device 1105 that supports single-carrier data and multi-carrier reference signals in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting single-carrier data and multi-carrier reference signals). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication in accordance with examples as disclosed herein. For example, the communications manager 1120 may be configured as or otherwise support a means for generating a first waveform including an orthogonal frequency domain multiplexing waveform for communicating one or more reference signals via a set of time-frequency resources. The communications manager 1120 may be configured as or otherwise support a means for generating a second waveform including a single-carrier waveform for communicating a set of data bits via the set of time-frequency resources. The communications manager 1120 may be configured as or otherwise support a means for transmitting, via the set of time-frequency resources, the first waveform and the second waveform.

By including or configuring the communications manager 1120 in accordance with examples as described herein, the device 1105 may support techniques for improved user experience related to reduced processing, reduced power consumption, higher throughput, longer battery life, and improved utilization of processing capability, among other examples.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of single-carrier data and multi-carrier reference signals as described herein, or the processor 1135 and the memory 1125 may be otherwise configured to perform or support such operations.

Figure 12:
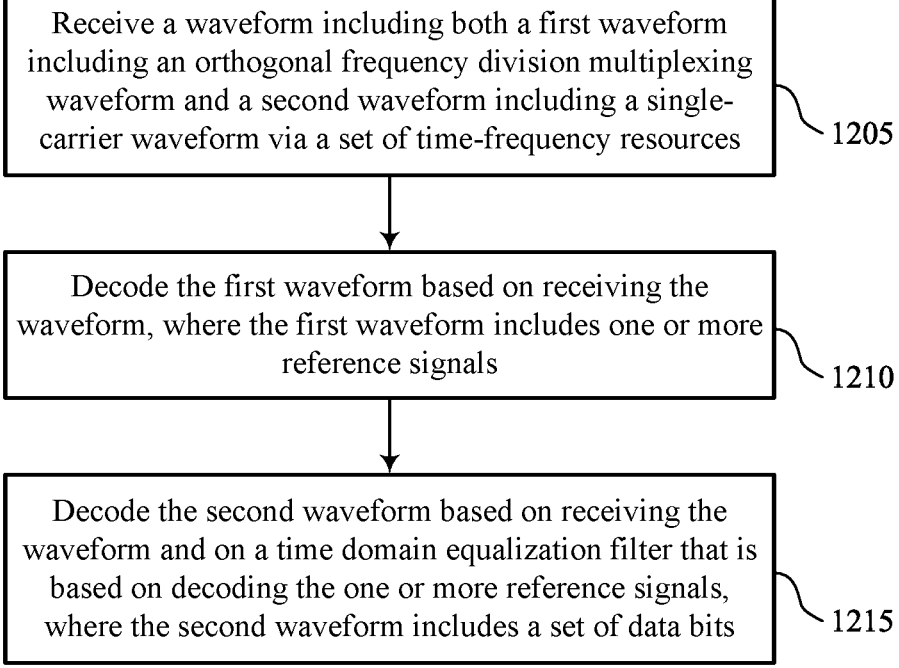

FIG. 12 illustrates a flowchart showing a method 1200 that supports single-carrier data and multi-carrier reference signals in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a waveform including both a first waveform including an orthogonal frequency division multiplexing waveform and a second waveform including a single-carrier waveform via a set of time-frequency resources. The operations of 1205 may be performed in accordance with examples as disclosed herein. In some examples, aspects of the operations of 1205 may be performed by a waveform reception component 625 as described with reference to FIG. 6.

At 1210, the method may include decoding the first waveform based on receiving the waveform, where the first waveform includes one or more reference signals. The operations of 1210 may be performed in accordance with examples as disclosed herein. In some examples, aspects of the operations of 1210 may be performed by a reference signal decoding component 630 as described with reference to FIG. 6.

At 1215, the method may include decoding the second waveform based on receiving the waveform and on a time domain equalization filter that is based on decoding the one or more reference signals, where the second waveform includes a set of data bits. The operations of 1215 may be performed in accordance with examples as disclosed herein. In some examples, aspects of the operations of 1215 may be performed by a data decoding component 635 as described with reference to FIG. 6.

FIG. 13 illustrates a flowchart showing a method 1300 that supports single-carrier data and multi-carrier reference signals in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a waveform including both a first waveform including an orthogonal frequency division multiplexing waveform and a second waveform including a single-carrier waveform via a set of time-frequency resources. The waveform further includes a third waveform comprising a second orthogonal frequency division multiplexing waveform. The operations of 1305 may be performed in accordance with examples as disclosed herein. In some examples, aspects of the operations of 1305 may be performed by a waveform reception component 625 as described with reference to FIG. 6.

At 1310, the method may include decoding the third waveform including one or more second reference signals based on receiving the waveform and a periodicity of the one or more second reference signals. The operations of 1310 may be performed in accordance with examples as disclosed herein. In some examples, aspects of the operations of 1310 may be performed by a reference signal decoding component 640 as described with reference to FIG. 6.

At 1315, the method may include decoding the first waveform based on receiving the waveform, where the first waveform includes one or more reference signals. The operations of 1315 may be performed in accordance with examples as disclosed herein. In some examples, aspects of the operations of 1315 may be performed by a reference signal decoding component 630 as described with reference to FIG. 6.

At 1320, the method may include decoding the second waveform based on receiving the waveform and on a time domain equalization filter that is based on decoding the one or more reference signals, where the second waveform includes a set of data bits. The operations of 1320 may be performed in accordance with examples as disclosed herein. In some examples, aspects of the operations of 1320 may be performed by a data decoding component 635 as described with reference to FIG. 6.

FIG. 14 illustrates a flowchart showing a method 1400 that supports single-carrier data and multi-carrier reference signals in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a waveform including both a first waveform including an orthogonal frequency division multiplexing waveform and a second waveform including a single-carrier waveform via a set of time-frequency resources. The waveform further includes a third waveform comprising a second orthogonal frequency division multiplexing waveform. The operations of 1405 may be performed in accordance with examples as disclosed herein. In some examples, aspects of the operations of 1405 may be performed by a waveform reception component 625 as described with reference to FIG. 6.

At 1410, the method may include decoding the third waveform including one or more second reference signals based on receiving the waveform and a periodicity of the one or more second reference signals. The operations of 1410 may be performed in accordance with examples as disclosed herein. In some examples, aspects of the operations of 1410 may be performed by a reference signal decoding component 640 as described with reference to FIG. 6.

At 1415, the method may include decoding the first waveform based on receiving the waveform, where the first waveform includes one or more reference signals. The operations of 1415 may be performed in accordance with examples as disclosed herein. In some examples, aspects of the operations of 1415 may be performed by a reference signal decoding component 630 as described with reference to FIG. 6.

At 1420, the method may include performing a time offset correction procedure for the waveform based on the periodicity of the one or more second reference signals. The operations of 1420 may be performed in accordance with examples as disclosed herein. In some examples, aspects of the operations of 1420 may be performed by a timing offset correction component 655 as described with reference to FIG. 6.

At 1425, the method may include decoding the second waveform based on receiving the waveform and on a time domain equalization filter that is based on decoding the one or more reference signals, where the second waveform includes a set of data bits. The operations of 1425 may be performed in accordance with examples as disclosed herein. In some examples, aspects of the operations of 1425 may be performed by a data decoding component 635 as described with reference to FIG. 6.

FIG. 15 illustrates a flowchart showing a method 1500 that supports single-carrier data and multi-carrier reference signals in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include generating a first waveform including an orthogonal frequency domain multiplexing waveform for communicating one or more reference signals via a set of time-frequency resources. The operations of 1505 may be performed in accordance with examples as disclosed herein. In some examples, aspects of the operations of 1505 may be performed by a waveform generation component 1025 as described with reference to FIG. 10.

At 1510, the method may include generating a second waveform including a single-carrier waveform for communicating a set of data bits via the set of time-frequency resources. The operations of 1510 may be performed in accordance with examples as disclosed herein. In some examples, aspects of the operations of 1510 may be performed by a waveform generation component 1025 as described with reference to FIG. 10.

At 1515, the method may include transmitting, via the set of time-frequency resources, the first waveform and the second waveform. The operations of 1515 may be performed in accordance with examples as disclosed herein. In some examples, aspects of the operations of 1515 may be performed by a waveform transmission component 1030 as described with reference to FIG. 10.

Figure 16:
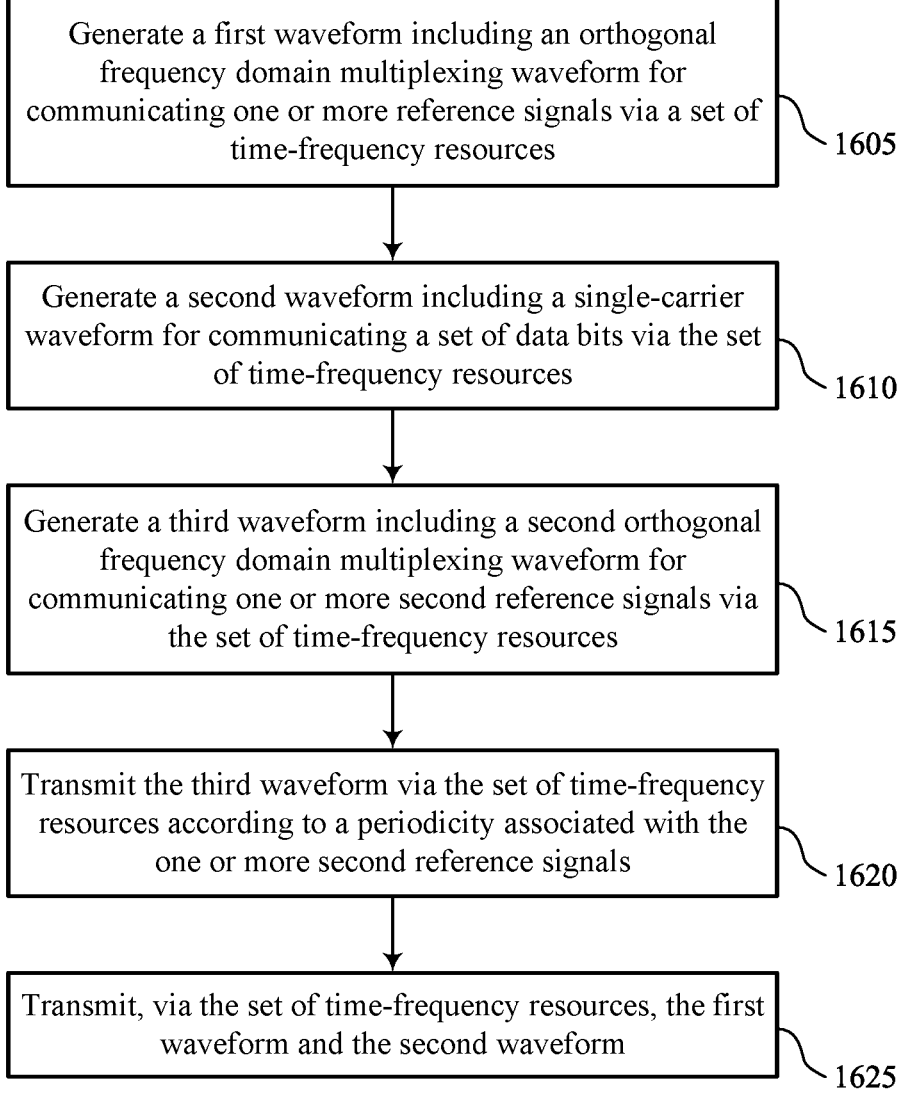

FIG. 16 illustrates a flowchart showing a method 1600 that supports single-carrier data and multi-carrier reference signals in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include generating a first waveform including an orthogonal frequency domain multiplexing waveform for communicating one or more reference signals via a set of time-frequency resources. The operations of 1605 may be performed in accordance with examples as disclosed herein. In some examples, aspects of the operations of 1605 may be performed by a waveform generation component 1025 as described with reference to FIG. 10.

At 1610, the method may include generating a second waveform including a single-carrier waveform for communicating a set of data bits via the set of time-frequency resources. The operations of 1610 may be performed in accordance with examples as disclosed herein. In some examples, aspects of the operations of 1610 may be performed by a waveform generation component 1025 as described with reference to FIG. 10.

At 1615, the method may include generating a third waveform including a second orthogonal frequency domain multiplexing waveform for communicating one or more second reference signals via the set of time-frequency resources. The operations of 1615 may be performed in accordance with examples as disclosed herein. In some examples, aspects of the operations of 1615 may be performed by a waveform generation component 1025 as described with reference to FIG. 10.

At 1620, the method may include transmitting the third waveform via the set of time-frequency resources according to a periodicity associated with the one or more second reference signals. The operations of 1620 may be performed in accordance with examples as disclosed herein. In some examples, aspects of the operations of 1620 may be performed by a waveform transmission component 1030 as described with reference to FIG. 10.

At 1625, the method may include transmitting, via the set of time-frequency resources, the first waveform and the second waveform. The operations of 1625 may be performed in accordance with examples as disclosed herein. In some examples, aspects of the operations of 1625 may be performed by a waveform transmission component 1030 as described with reference to FIG. 10.

The following provides an overview of aspects of the present disclosure:

Aspect 1: A method for wireless communication, comprising: receiving a waveform including both a first waveform comprising an orthogonal frequency division multiplexing waveform and a second waveform comprising a single-carrier waveform via a set of time-frequency resources; decoding the first waveform based at least in part on receiving the waveform, wherein the first waveform comprises one or more reference signals; and decoding the second waveform based at least in part on receiving the waveform and on a time domain equalization filter that is based at least in part on decoding the one or more reference signals, wherein the second waveform comprises a set of data bits.

Aspect 2: The method of aspect 1, wherein the waveform further includes a third waveform comprising a second orthogonal frequency division multiplexing waveform, the method further comprising: decoding the third waveform comprising one or more second reference signals based at least in part on receiving the waveform and a periodicity of the one or more second reference signals.

Aspect 3: The method of aspect 2, wherein the second waveform is decoded without pulse shaping.

Aspect 4: The method of any of aspects 2 through 3, wherein decoding the second waveform comprises: performing a time offset correction procedure for the waveform based at least in part on the periodicity of the one or more second reference signals.

Aspect 5: The method of any of aspects 2 through 4, wherein the one or more second reference signals comprise one or more synchronization signal block reference signals.

Aspect 6: The method of any of aspects 1 through 5, wherein decoding the first waveform comprises: descrambling the one or more reference signals; and estimating the time domain equalization filter based at least in part on the descrambled one or more reference signals.

Aspect 7: The method of aspect 6, wherein determining the time domain equalization filter comprises: applying a transform to the descrambled one or more reference signals to estimate the time domain equalization filter.

Aspect 8: The method of aspect 7, wherein the transform comprises a fast Fourier transform or an inverse fast Fourier transform.

Aspect 9: The method of any of aspects 1 through 8, wherein the one or more reference signals comprise demodulation reference signals.

Aspect 10: A method for wireless communication, comprising: generating a first waveform comprising an orthogonal frequency domain multiplexing waveform for communicating one or more reference signals via a set of time-frequency resources; generating a second waveform comprising a single-carrier waveform for communicating a set of data bits via the set of time-frequency resources; and transmitting, via the set of time-frequency resources, the first waveform and the second waveform.

Aspect 11: The method of aspect 10, wherein the generating of the second waveform is performed without pulse shaping.

Aspect 12: The method of any of aspects 10 through 11, further comprising: generating a third waveform comprising a second orthogonal frequency domain multiplexing waveform for communicating one or more second reference signals via the set of time-frequency resources; and transmitting the third waveform via the set of time-frequency resources according to a periodicity associated with the one or more second reference signals.

Aspect 13: The method of aspect 12, wherein transmitting the third waveform further comprises: determining the periodicity of the one or more second reference signals based at least in part on one or more of a channel condition associated with the set of time-frequency resources and one or more hardware components of a device for performing the wireless communication.

Aspect 14: The method of any of aspects 12 through 13, wherein the one or more second reference signals comprises synchronization signal block reference signals.

Aspect 15: The method of any of aspects 10 through 14, wherein the one or more reference signals comprise demodulation reference signals.

Aspect 16: An apparatus for wireless communication, comprising a processor; memory coupled with the processor; and instructions stored in the memory and executable by the processor to cause the apparatus to perform a method of any of aspects 1 through 9.

Aspect 17: An apparatus for wireless communication, comprising at least one means for performing a method of any of aspects 1 through 9.

Aspect 18: A non-transitory computer-readable medium storing code for wireless communication, the code comprising instructions executable by a processor to perform a method of any of aspects 1 through 9.

Aspect 19: An apparatus for wireless communication, comprising a processor; memory coupled with the processor; and instructions stored in the memory and executable by the processor to cause the apparatus to perform a method of any of aspects 10 through 15.

Aspect 20: An apparatus for wireless communication, comprising at least one means for performing a method of any of aspects 10 through 15.

Aspect 21: A non-transitory computer-readable medium storing code for wireless communication, the code comprising instructions executable by a processor to perform a method of any of aspects 10 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising: one or more processors; and one or more memories coupled with the processor and storing instructions executable by the one or more processors to cause the apparatus to:

receive a waveform including both a first waveform comprising an orthogonal frequency division multiplexing waveform and a second waveform comprising a single-carrier waveform via a set of time-frequency resources;

decode the first waveform based at least in part on receiving the waveform, wherein the first waveform comprises one or more reference signals; and decode the second waveform based at least in part on receiving the waveform and on a time domain equalization filter that is based at least in part on decoding the one or more reference signals, wherein the second waveform comprises a set of data bits.

2. The apparatus of claim 1, wherein the waveform further includes a third waveform comprising a second orthogonal frequency division multiplexing waveform, and the instructions are further executable by the one or more processors to cause the apparatus to:

decode the third waveform comprising one or more second reference signals based at least in part on receiving the waveform and on a periodicity of the one or more second reference signals.

3. The apparatus of claim 1, wherein the second waveform is decoded without pulse shaping.

4. The apparatus of claim 2, wherein the instructions to decode the second waveform are executable by the one or more processors to cause the apparatus to:

perform a time offset correction procedure for the waveform based at least in part on the periodicity of the one or more second reference signals.

5. The apparatus of claim 2, wherein the one or more second reference signals comprise one or more synchronization signal block reference signals.

6. The apparatus of claim 1, wherein the instructions to decode the first waveform are executable by the one or more processors to cause the apparatus to:

descramble the one or more reference signals; and estimate the time domain equalization filter based at least in part on the descrambled one or more reference signals.

7. The apparatus of claim 6, wherein the instructions to determine the time domain equalization filter are executable by the one or more processors to cause the apparatus to:

apply a transform to the descrambled one or more reference signals to estimate the time domain equalization filter.

8. The apparatus of claim 7, wherein the transform comprises a fast Fourier transform or an inverse fast Fourier transform.

9. The apparatus of claim 1, wherein the one or more reference signals comprise demodulation reference signals.

10. A method for wireless communication, comprising:

receiving a waveform including both a first waveform comprising an orthogonal frequency division multiplexing waveform and a second waveform comprising a single-carrier waveform via a set of time-frequency resources;

decoding the first waveform based at least in part on receiving the waveform, wherein the first waveform comprises one or more reference signals; and decoding the second waveform based at least in part on receiving the waveform and on a time domain equalization filter that is based at least in part on decoding the one or more reference signals, wherein the second waveform comprises a set of data bits.

11. The method of claim 10, wherein the waveform further includes a third waveform comprising a second orthogonal frequency division multiplexing waveform, the method further comprising:

decoding the third waveform comprising one or more second reference signals based at least in part on receiving the waveform and a periodicity of the one or more second reference signals.

12. The method of claim 11, wherein the second waveform is decoded without pulse shaping.

13. The method of claim 11, wherein decoding the second waveform comprises:

performing a time offset correction procedure for the waveform based at least in part on the periodicity of the one or more second reference signals.

14. The method of claim 11, wherein the one or more second reference signals comprise one or more synchronization signal block reference signals.

15. The method of claim 10, wherein decoding the first waveform comprises:

descrambling the one or more reference signals; and estimating the time domain equalization filter based at least in part on the descrambled one or more reference signals.

16. The method of claim 15, wherein determining the time domain equalization filter comprises:

applying a transform to the descrambled one or more reference signals to estimate the time domain equalization filter.

17. The method of claim 16, wherein the transform comprises a fast Fourier transform or an inverse fast Fourier transform.

18. The method of claim 10, wherein the one or more reference signals comprise demodulation reference signals.

* * * * *